United States Patent
Jafarian et al.

(10) Patent No.: US 8,923,426 B2
(45) Date of Patent: Dec. 30, 2014

(54) METHODS AND APPARATUS FOR MANAGING WIRELESS MEDIUM UTILIZATION

(71) Applicant: Qualcomm Incorporated, San Diego, CA (US)

(72) Inventors: Amin Jafarian, San Diego, CA (US); Santosh P. Abraham, San Diego, CA (US); George Cherian, San Diego, CA (US); Simone Merlin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 88 days.

(21) Appl. No.: 13/658,553

(22) Filed: Oct. 23, 2012

(65) Prior Publication Data
US 2014/0112405 A1    Apr. 24, 2014

(51) Int. Cl.
*H04B 7/02* (2006.01)
*H04B 7/04* (2006.01)
*H04W 72/12* (2009.01)

(52) U.S. Cl.
CPC .......... *H04B 7/0413* (2013.01); *H04W 72/1242* (2013.01); *H04W 72/1252* (2013.01)
USPC ............................. 375/267; 375/259; 375/260

(58) Field of Classification Search
CPC ........... H04B 7/0413; H04W 72/1242; H04W 72/1252
USPC ........... 375/267, 259, 260; 370/203, 204, 208
See application file for complete search history.

(56) References Cited

U.S. PATENT DOCUMENTS

| | | | |
|---|---|---|---|
| 7,065,051 B2 | 6/2006 | Airy et al. | |
| 7,370,116 B2 | 5/2008 | Chan et al. | |
| 8,553,572 B2 * | 10/2013 | Farrell et al. | 370/252 |
| 2006/0146721 A1 | 7/2006 | Attar et al. | |
| 2010/0085923 A1 | 4/2010 | Nyberg et al. | |
| 2010/0260047 A1 | 10/2010 | Chheda et al. | |
| 2012/0140633 A1 * | 6/2012 | Stanwood et al. | 370/235 |

FOREIGN PATENT DOCUMENTS

EP    1508992 A2    2/2005

OTHER PUBLICATIONS

International Search Report and Written Opinion—PCT/US2012/071051—ISA/EPO—Oct. 2, 2013.

* cited by examiner

*Primary Examiner* — Dhaval Patel
(74) *Attorney, Agent, or Firm* — S. Hossain Beladi

(57) ABSTRACT

Methods, apparatus, and computer readable medium manage the utilization of a wireless medium capable of transmitting multiple channels of data simultaneously. A plurality of messages are stored in a queue for transmission on the wireless medium. A wireless medium utilization for transmitting a first message over the multi-channel medium is determined. Each of the messages stored in the queue is delayed based at least in part on the determined wireless medium utilization. In some embodiments, a message may be delayed based at least in part on a state of a connection used by the message. For example, if the connection is in a ramp-up or slow start phase, the message may not be delayed. Messages may also be delayed based on a type of the message. For example, messages generated by interactive applications, such as web browsers or instant messaging applications may not be delayed.

47 Claims, 13 Drawing Sheets

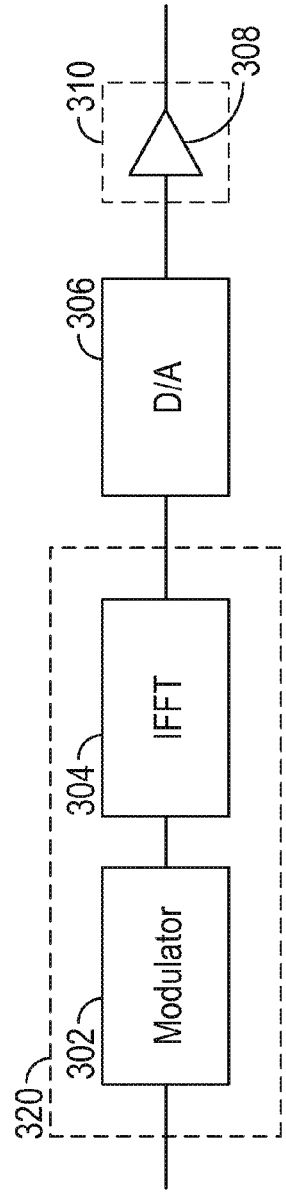
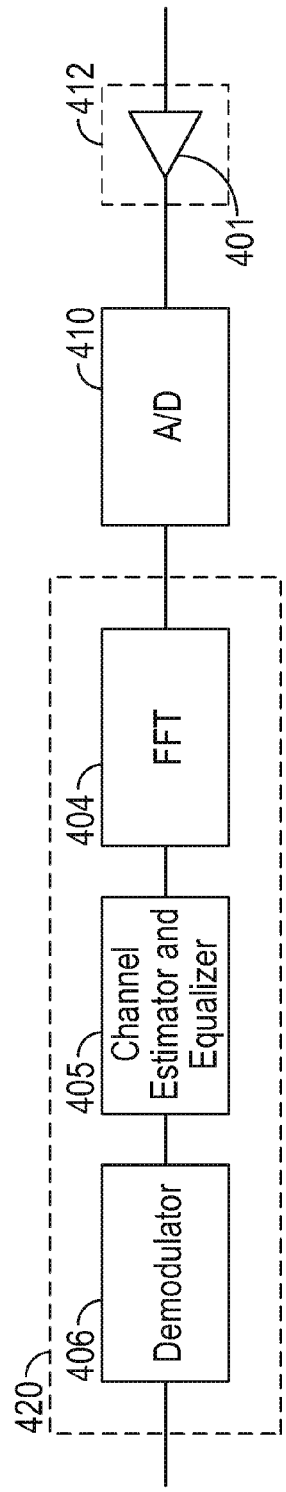

METHODS AND APPARATUS FOR MANAGING WIRELESS MEDIUM UTILIZATION

BACKGROUND

1. Field

The present application relates generally to wireless communications, and more specifically to systems, methods, and devices for communication in a multiple input, multiple output (MIMO) environment. Certain aspects herein provide for improved utilization of a wireless medium when utilizing MIMO.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Wireless communication systems are widely deployed to provide various types of communication content such as voice, data, and so on. These systems may be capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (TDMA) systems, 3rd Generation Partnership Project (3GPP) Long Term Evolution (LTE) systems, Long Term Evolution Advanced (LTE-A) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NO transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system supports both time division duplex (TDD) and frequency division duplex (FDD) operation. In a TDD system, the forward and reverse link transmissions are on the same frequency region so that the reciprocity principle may allow the estimation of the forward link channel from the reverse link channel. In both FDD and TDD systems, a feedback sent from the user terminal may be used among other methods to convey channel state information to a base station. The channel state information at the base station enables it to extract transmit beamforming gain on the forward link when multiple antennas are available at the base station.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved approaches for communicating long data packets.

One aspect of the disclosure provides a method for managing the utilization of a wireless medium capable of transmitting multiple channels simultaneously. The method includes storing a plurality of messages in a queue for transmission on the wireless medium, determining a wireless medium utilization for transmitting a first message over the multi-channel medium, and determining to delay transmission of each of the messages stored in the queue based at least in part on the determined wireless medium utilization.

Another aspect disclosed is an apparatus for increasing the utilization of a wireless medium capable of transmitting multiple channels simultaneously. The apparatus includes a processor configured to store a plurality of messages in a queue for transmission on the wireless medium, determine a wireless medium utilization for transmitting a message over the multi-channel medium, and determine to delay transmission of each of the messages stored in the queue based at least in part on the determined wireless medium utilization.

Another aspect disclosed is an apparatus for increasing the utilization of a wireless medium. The apparatus includes means for storing a plurality of messages in a queue for transmission on the wireless medium, means for determining a wireless medium utilization for transmitting a message over the multi-channel medium, and means for determining to delay transmission of each of the messages stored in the queue based at least in part on the determined wireless medium utilization.

Another aspect disclosed is a non-transitory, computer readable medium comprising instructions that when executed cause a processor to perform a method of managing the utilization of a wireless medium capable of transmitting multiple channels simultaneously. The method includes storing a plurality of messages in a queue for transmission on the wireless medium, determining a wireless medium utilization for transmitting a first message over the multi-channel medium, and determining to delay transmission of each of the messages stored in the queue based at least in part on the determined wireless medium utilization.

BRIEF DESCRIPTION OF THE DRAWINGS

FIG. 3 is a timing diagram illustrating operation of a packet scheduler.

FIG. 4 illustrates various components that may be utilized in the wireless device of FIG. 2 to receive wireless communications.

DETAILED DESCRIPTION

Figure 1:
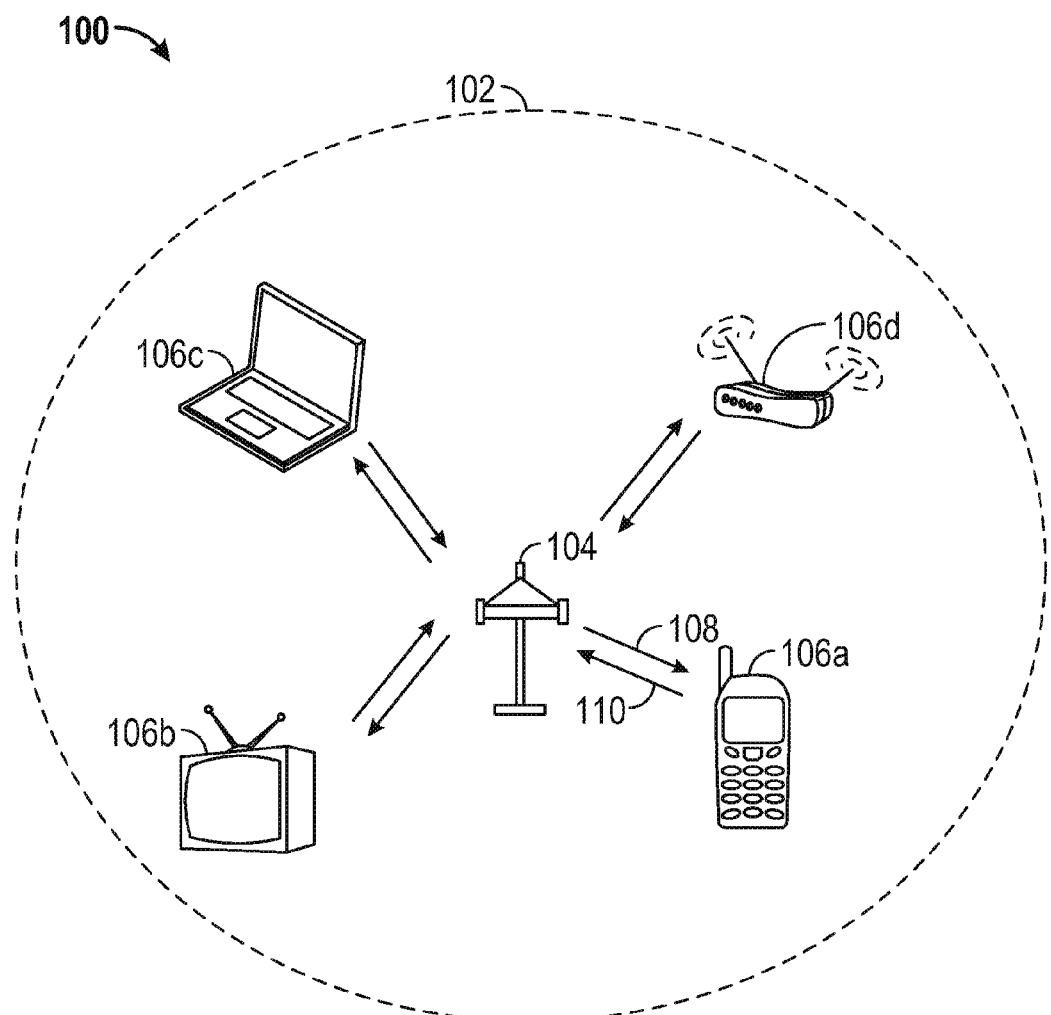
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106a, 106b, 106c, 106d (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
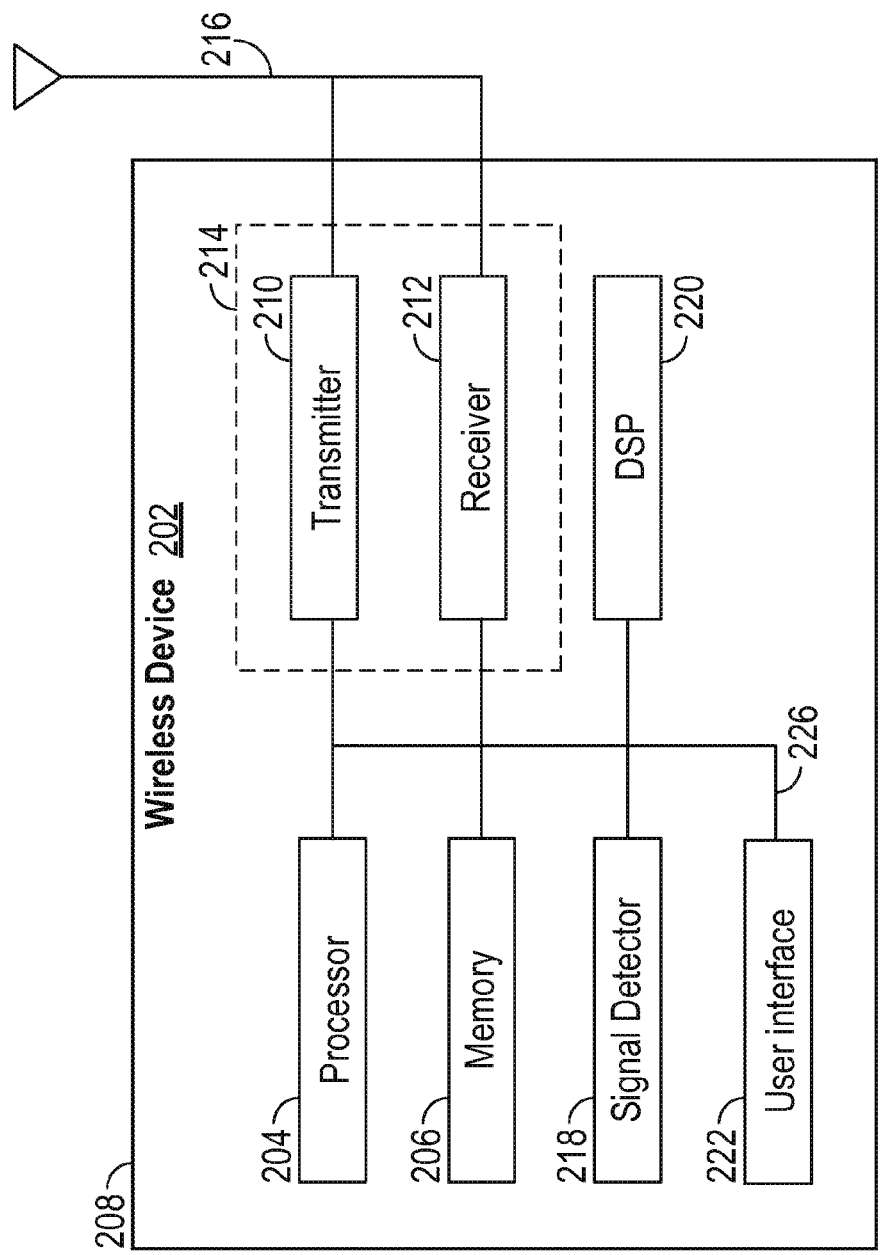
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described, or each may be implemented using a plurality of separate elements.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units that are temporally long and/or that include one or more training fields interposed between a plurality of data symbols, as will be discussed in additional detail below.

The wireless device 202a of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202 (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

In some aspects, the DSP 320 is configured to insert one or more training fields between a plurality of data symbols. The DSP 320 may determine a position or location of the one or more training fields in the data unit based on information received from the processor 204 (FIG. 2), and/or stored in the memory 206 (FIG. 2) or in a portion of the DSP 320. Inserting the training fields in the data unit will be discussed in additional detail.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmit, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

In some aspects, the transmitter 310 is configured to transmit the data units over a bandwidth of approximately 2.5 MHz or 1.25 MHz, or lower. When using such bandwidths, transmission of the data unit may be performed over a relatively lengthy period of time. For example, a data unit composed of 500 bytes or octets may be transmitted over a period of approximately 11 milliseconds. Such transmission is approximately sixteen times slower than comparable transmissions implemented pursuant to the 802.11ac standard over bandwidths of approximately 20 MHz.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units that are temporally long and/or that include one or more training fields interposed between a plurality of data symbols, as will be discussed in additional detail below. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below are described in additional detail below.

In some aspects, the receiver 412 is configured to receive the data units over a bandwidth of approximately 2.5 MHz or 1.25 MHz, or lower. When using such bandwidths, reception of the data unit may be performed over a relatively lengthy period of time, for example approximately 11 milliseconds when the data unit is composed of 500 bytes. During this time, the channel over which the data unit is received may be changing. For example, conditions of the channel may change due to movement of the wireless device 202b or of a device transmitting the data unit, or due to weather or other environmental conditions such as the introduction of various obstacles. In such circumstances, information near the end of the data unit may not be correctly decoded if the wireless device 202b uses settings determined when reception of the data unit began. As described in additional detail below, however, the wireless device 202b may use the training fields interposed between the plurality of data symbols to form an updated estimate of the channel in order to properly decode one or more of the data symbols.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF), for example, to adjust the gain. Those having ordinary skill in the art will understand methods for performing AGC. In some aspects, the amplifier 401 comprises an LNA.

The wireless device 202b may comprise an analog to digital converter 410 configured to convert the amplified wireless signal from the receiver 410 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 or in another element of the wireless device 202 (FIG. 2). In some aspects, the analog to digital converter 410 is implemented in a transceiver or in a data receive processor.

The wireless device 202b may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or updated channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 or in another element of the wireless device 202 (e.g., see description above with reference to FIG. 2).

As discussed above, the wireless signal received at the receiver 412 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields that are also interposed between data symbols in the payload.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless devices 202a and 202b may implement a portion of a MIMO system using multiple antennas to simultaneously transmit data.

Figure 5:
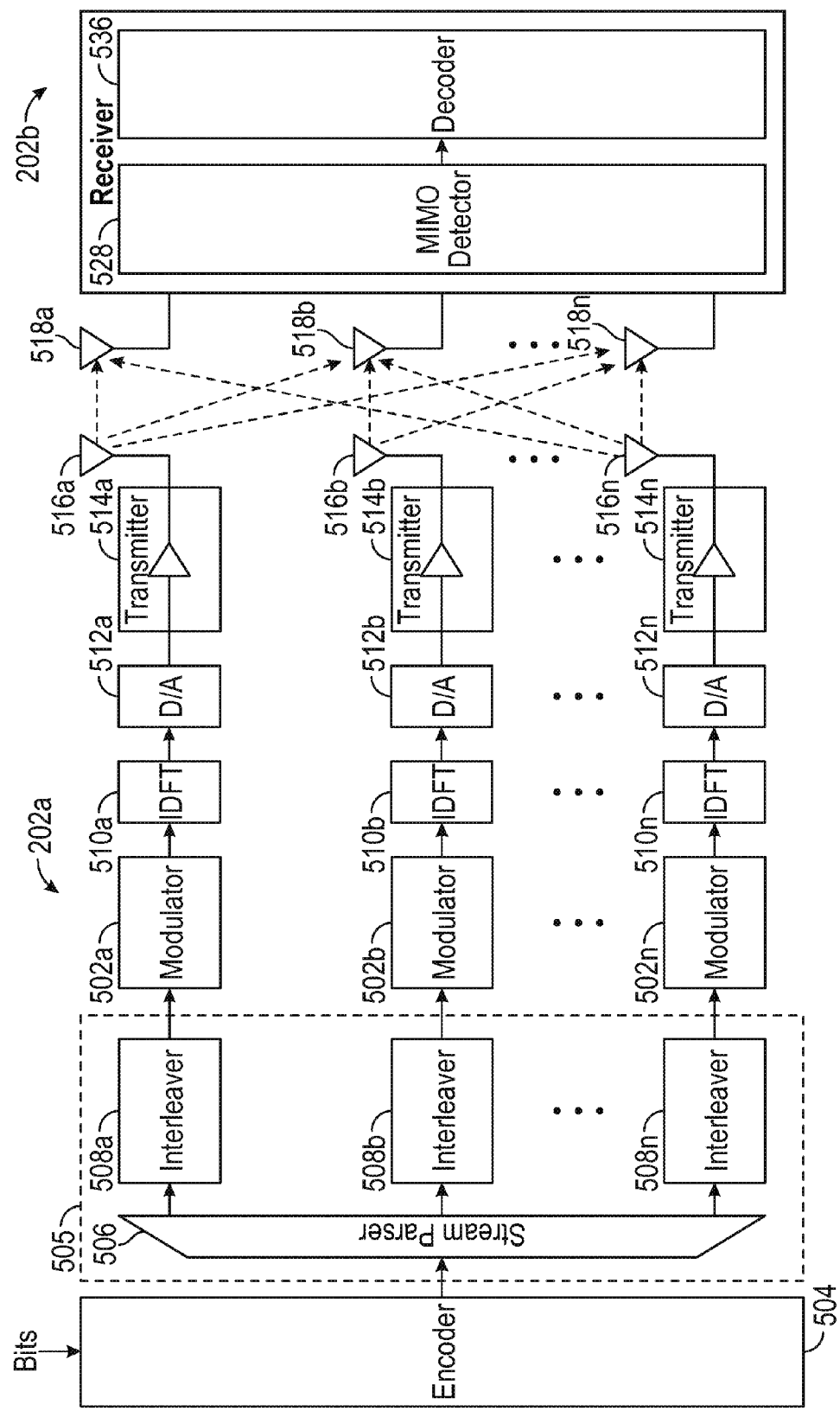
FIG. 5 is a functional block diagram of an exemplary MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolution code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX} * k + n$ (i.e., round-robin with one bit per spatial stream, then on to the next spatial stream where $k_r$ is the input bit index and $N_{TX}$ is the number of transmitters/spatial streams). Another more general function f(k,n) may also be used, for example, sending two bits to a spatial stream, then moving on to the next spatial stream. Each interleaver 508a, 508b, and 508n may each thereafter distribute bits so that errors may be recovered due to fading or other channel conditions. Hereinafter the interleavers 508a, 508b, and 508n may be referred to an interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping a group of six bits), 64-QAM, and the like. The modulated bits for each stream may be provided to transform modules 510a, 510b, and 510n. In some implementations, the transform modules 510a, 510b, and 510n may perform an inverse discrete time fourier transform (IDFT) to convert the modulated bits from a frequency domain into a time domain. The transform modules 510a, 510b, and 510n may operate according to different modes as described above with reference to FIG. 3. For example, the transform modules 510a, 510b, and 510n may be configured to operate according to a 32 point mode or a 64 point mode. In some implementations, the modulated bits may be encoded using space time block coding (STBC) and spatial mapping may be performed before being provided to transform modules 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, and 514c and using antennas 516a, 516b, or 516n, into a wireless radio space over a desired frequency bandwidth (e.g., 1 MHz, 2 MHz, 4 MHz, 8 MHz, and 16 MHz, or higher).

In some embodiments, antennas 516a, 516b, and 516n are distinct and spatially separated antennas. In other embodiments, distinct signals may be combined into different polarizations off of fewer than N antennas. An example of this is where spatial rotation or spatial spreading is done and multiple spatial streams are mapped on a single antenna. Further, it should be understood that distinct spatial streams can be organized in different manners. For example, a transmit antenna may carry data from more than one spatial stream or several transmit antennas may carry data from a spatial stream. For example, consider the case of a transmitter with four transmit antennas and two spatial streams. Each spatial stream can be mapped onto two transmit antennas, so two antennas are carrying data from just one spatial stream.

Figure 6:
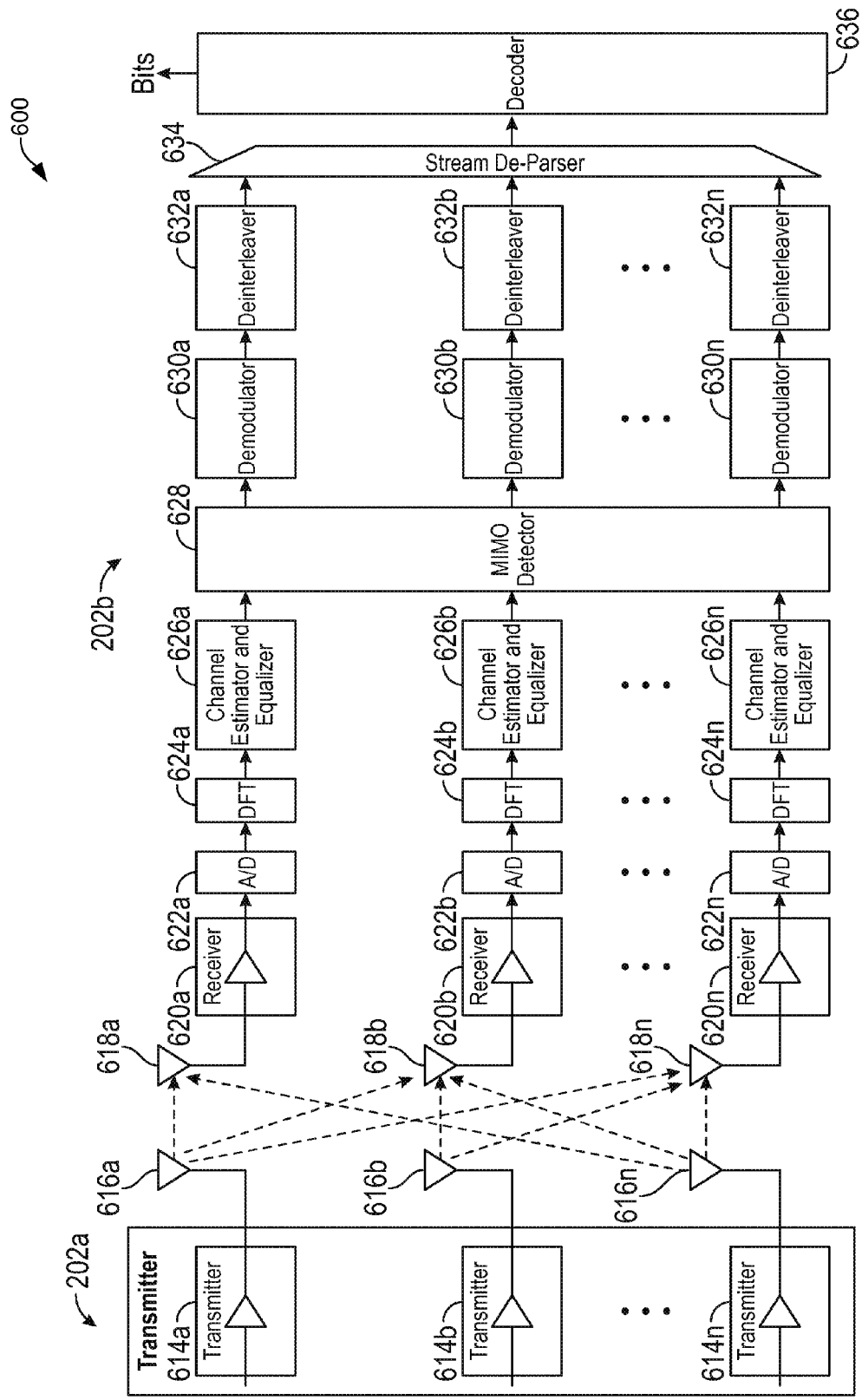
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system 600 that may be implemented in wireless devices such as the wireless device 202 of FIG. 2 to receive wireless communications. The MIMO system may make use of some or all of the components described with reference to FIG. 4. The wireless device 202b may be configured to receive transmissions from the antennas 516a, 516b, and 516n of FIG. 5. A wireless device 202b receives signals from the channel at N antennas 518a, 518b, and 518n or 618a, 618b, and 618n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted into a frequency spectrum via transform modules 624a, 624b, and 624n. As described above, the transform modules 624a, 624b, and 624n may operate according to various modes and according to the size and bandwidth used (e.g., 32 point 64 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628 (e.g., corresponding to MIMO detector 528 of FIG. 5) which may thereafter provide its output to demodulators 630a, 630b, and 630n which may demodulate the bits according to one of the modulation techniques as described above. Demodulated bits may then be provided to deinterleavers 632a, 632b, and 632n which may pass bits into a stream de-parser 634 which may provide the bits into a single bit stream into a decoder 636 (e.g., corresponding to decoder 536 of FIG. 5) that may decode the bits into an appropriate data stream.

Figure 7:
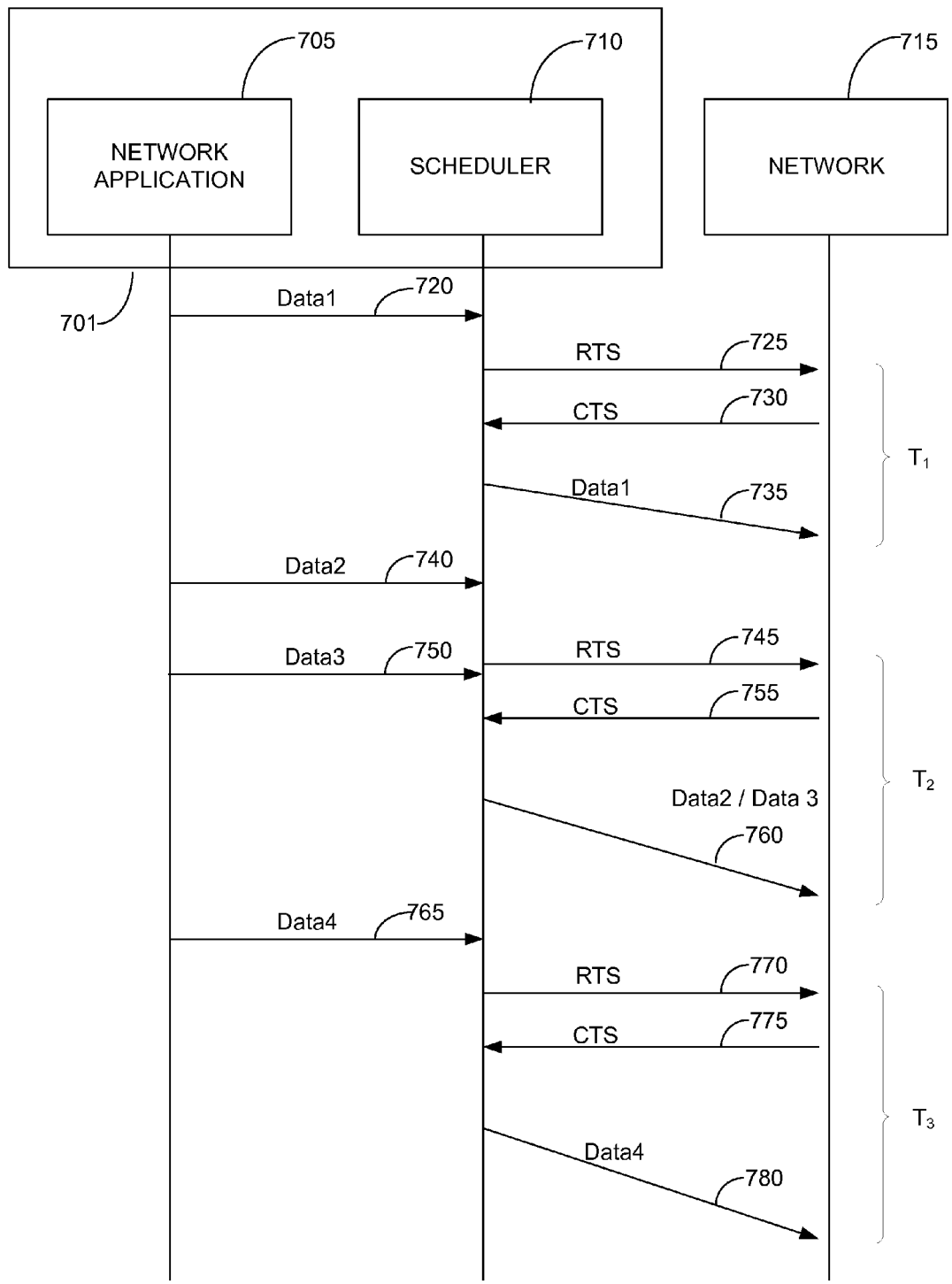
FIG. 7 is a timing diagram illustrating the operation of one implementation of a scheduler in a MIMO system, such as the MIMO system 600 illustrated in FIG. 6.

FIG. 7 is a timing diagram illustrating the operation of one implementation of a scheduler in a MIMO system, such as the MIMO system 600 illustrated in FIG. 6. FIG. 7 shows a wireless node 701 and a network 715. In an embodiment, wireless node 701 may be wireless device 202, illustrated in FIG. 2. The embodiment of the MIMO network 715 shown in FIG. 7 may support data transmission on up to three (3) channels simultaneously. Implemented within wireless node 701 is a network application 705, and a scheduler 710. In an embodiment, network application 705 and scheduler 710 may be implemented as processor instructions stored in the memory component 206 of wireless device 202, illustrated in FIG. 2.

The network application 705 may be any application that transmits data on a wireless network. For example, network application 705 may be a web browsing application, instant messaging application, streaming application, or an email application. The scheduler 710 manages the transmission of messages on the network 715. The scheduler 710 may receive messages from multiple network applications. Those messages may be received directly from the network application themselves, or indirectly from other intervening modules or components of wireless device 202 (not shown).

FIG. 7 shows a data message 720 sent from the network application 705 to the scheduler 710. When the scheduler 710 receives the data message 720, the scheduler 710 transmits a request-to-send message 725 on the network 715. In response, the scheduler 710 receives a clear-to-send message 730 from the network 715. In some embodiments, the clear-to-send message 730 may be transmitted by an access point, such as access point 104 illustrated in FIG. 1. The clear-to-send message indicates that the scheduler 710 may transmit data on network 715. In an embodiment, the clear-to-send message 730 may also inhibit other nodes on the network 715 (not shown) from transmitting during a period of time after the clear-to-send message 730 is transmitted.

In response to receiving the clear-to-send message 730, the scheduler 710 transmits a data message 735 on the network 715. The data message 735 may be transmitted over a channel of the network 715. The data included in data message 735 corresponds to the data transmitted by the network application 705 in data message 720. Note that in the illustrated scenario of FIG. 7, the scheduler 710 has only data message 720 waiting for transmission when the clear-to-send message 730 is received. Therefore, the scheduler 710 only sends data corresponding to the data received in data message 720 on the network in data message 735.

In a network that can support the transmission of multiple messages simultaneously, such as network 715, the capacity of network 715 may be underutilized during the time period $T_1$ when data message 735 is transmitted. This underutilization may occur due to the scheduler's 710 reservation of the network capacity via use of the RTS/CTS exchange. When CTS message 730 is transmitted, it may be received by a set of nodes sharing a network capacity of network 715 with node 701. This set of nodes may be inhibited from transmitting data on network 715 after the CTS message 730 is transmitted.

One or more nodes in the set of nodes may have data buffered and available for transmission on wireless network 715 during time period $T_1$. These nodes may have sufficient data buffered such that they could transmit on multiple channels of network 715 simultaneously, thus providing a higher utilization than node 701, which has only a single data message 720 available for transmission. However, when these one or more nodes receives the CTS message 730, they do not attempt transmission of their buffered data on wireless network 715 until after time period $T_1$ has passed. Because node 701 transmits only a single message during time period $T_1$ when another node may have been able to transmit multiple messages during time period $T_1$, the scheduler 710 may cause a lower utilization of the wireless network during time period $T_1$.

After data message 735 has been transmitted on the network 715, the scheduler 710 receives another data message 740 from network application 705. In response, the scheduler 710 sends a request-to-send message 745. Soon after the request-to-send message 745 is transmitted, a data message 750 is sent by the network application 705 to the scheduler 710. As a result, scheduler 710 has data from two messages waiting to be sent on the network 715 when the clear to send message 755 is received. These messages correspond to data2 from message 740 and data3 from message 750.

The clear-to-send message 755 may be transmitted by an AP 104. The clear-to-send message 755 indicates to the scheduler 710 that it may now transmit data on the network 715. In response, the scheduler 710 transmits a data message 760 on the network 715. Data included in the data message 760 corresponds to data included in the data messages 740 and 750 sent by the network application 705 to the scheduler 710. Data message 760 may utilize two channels of a MIMO system to send data2 and data 3 substantially simultaneously. For example, data corresponding to data2 from message 740 may be sent over a first channel. Data corresponding to data 3 from message 750 may be sent over a second channel substantially simultaneously or at least overlapping in time with the transmission of data corresponding to data2 on the first channel. Use of multiple channels may reduce the amount of time necessary to transmit data2 and data 3 when compared to transmitting data2 and data3 serially over a single channel.

With scheduler 710, data message(s) 760's higher utilization of the network 715 when compared to the utilization during time period $T_1$ may be a function of the random timing of data messages 720, 740, and 750 in relation to when a clear-to-send message (such as messages 730 and 755) is received by the scheduler 710. The illustrated implementation of the scheduler 710 may initiate transmission of data on the network 715 whenever there is at least one data message available for transmission. This single message may occupy only one channel on a wireless medium, even if the wireless medium can support the transmission of data over more than one channel simultaneously. Therefore, the transmission of data over multiple channels in implementations utilizing scheduler 710 may depend on the arrival times of messages generated by one or more network applications, such as network application 705. In an embodiment, the arrival times of these messages may be considered random, resulting in possibly low utilization of the wireless medium.

FIG. 7 next illustrates that after the scheduler 710 transmits data message 760, another data message 765 is received from the network application 705. In response, the scheduler 710 transmits a request-to-send message 770 on network 715 and receives a clear-to-send message 775. In response, the scheduler 710 transmits a single data message 780. The data included in the data message 780 corresponds to data included in the data message 765 received from the network application 705. When data message 780 is sent, a transmission capacity of the network 715 during time period $T_3$ may be underutilized. As discussed above, if the network 715 is, for example, a MIMO system that can support transmission of data over multiple channels simultaneously, the transmitting of data message 780 may underutilize the transmission medium. For example, if another wireless node (not shown) could transmit data over a maximum number of channels during time period $T_3$, the scheduler's use of the network during time period $T_3$ may reduce the amount of data the network 715 can potentially carry.

With the scheduler 710 shown in FIG. 7, the wireless medium may be utilized inefficiently. For example, utilization of the wireless medium by the scheduler may depend on the timing of messages sent by the network application 705 to the scheduler 710. For example, because only data message 720 is received by the scheduler 710 before the clear to send message 730, the data message 735 sent on the network 715 includes only data from the single message 720. When two messages are received before the clear-to-send message 755 (as illustrated, data messages 740 and 750), the data from two messages may be sent concurrently after the clear-to-send message. Similar to the first case, when only the single data message 765 is received by the scheduler 710 before the clear-to-send message 775, the data message 780 only includes data from the single data message 765. This single data message 765 may utilize only one channel of the network 715.

In the illustrated embodiment, the scheduler 710 reserves transmission time on the wireless medium by transmitting request-to-send messages 725 and 745. Because the scheduler 710 may transmit request-to-send messages 725 and 745 when at least one message is waiting for transmission, the wireless medium may be reserved for transmission when the scheduler 710 has fewer messages available for concurrent transmission than the wireless medium can support. During the transmission time periods reserved by request-to-send messages 725 and 745, FIG. 7 illustrates that only one data message, messages 735 or 755 is sent during each time period. When utilizing a wireless medium that supports the transmission of more than one message simultaneously, for example, a MIMO wireless system, transmission capacity of the wireless medium may be underutilized by the scheduler 710.

Figure 8:
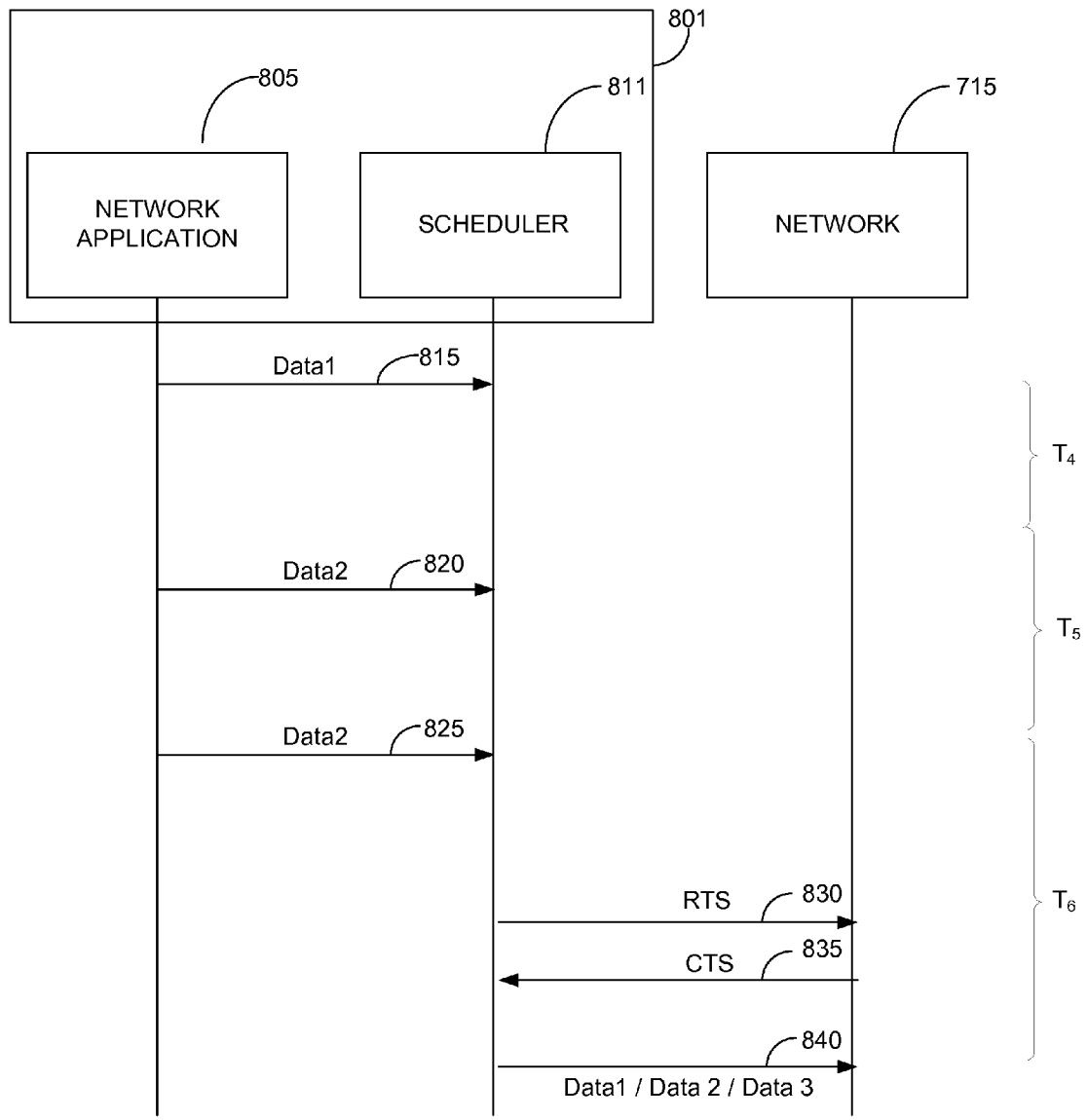
FIG. 8 is a timing diagram illustrating the operation of one implementation of a scheduler implementing one or more of the operative embodiments disclosed herein.

FIG. 8 is a timing diagram illustrating the operation of a scheduler implementing one or more of the operative embodiments disclosed herein. FIG. 8 shows a network node 801 and a network 715. In an embodiment, network node 801 may be wireless device 202. Implemented within the network node 801 are a network application 805 and a scheduler 811. Network application 805 and scheduler 811 may be implemented as processor instructions stored in the memory component 206 of wireless device 202, illustrated in FIG. 2. These instructions may configure the processor 204 of wireless device 202 to perform one or more functions.

As in FIG. 7, the network application 805 may be any application that sends data on a wireless network. For example, network application 805 may be a web browsing application, instant messaging application, streaming application, or an email application. Similar to the scheduler 710 of FIG. 7, the scheduler 811 manages the transmission of messages on the network 715. The scheduler 811 may receive messages from multiple network applications. Those messages may be received directly from the network application themselves, or indirectly from other intervening components of wireless device 202 (not shown).

FIG. 8 illustrates a first data message 815 being sent from the network application 805 to the scheduler 811. In some embodiments, the scheduler may store messages received from one or more network applications, such as network application 805, in a queue (not shown). The scheduler 811 may also determine a wireless medium utilization that can be achieved based on messages stored in the queue. In some embodiments, for example, embodiments that utilize MIMO, multiple messages may be sent simultaneously over a wireless transmission medium. In the illustrated scenario of FIG. 8, only a first data message 815 is stored in a queue during time $T_4$. If only a single message is available for transmission during time period $T_4$, the wireless medium may not be fully utilized if transmission was initiated by the scheduler 811 during this time period. To prevent this, the scheduler does not initiate transmission of data on the network 715 during time period $T_4$.

At the beginning of time period $T_5$, a data message 820 is received by the scheduler 811 from network application 805. In an embodiment, upon receiving the data message 820, the scheduler 811 may add message 820 to a transmission queue. The scheduler 811 may then determine a wireless medium utilization that can be achieved based on the messages in the transmission queue. If the utilization is below a threshold, the scheduler 811 may not initiate transmission of the messages on the transmission queue. If the utilization is above a threshold, the scheduler 811 may initiate transmission of messages in the transmission queue. FIG. 8 shows that when data message 820 is received, the scheduler 811 does not initiate transmission. For example, the scheduler 811 does not transmit a request-to-send message during time period $T_5$.

At the beginning of time period $T_6$, a data message 825 is received by the scheduler 811 from network application 805. In an embodiment, upon receiving the data message 825, the scheduler 811 may add message 825 to the transmission queue. The scheduler 811 may again determine a wireless medium utilization that can be achieved based on the message in the transmission queue. In the illustrated example of FIG. 8, after data message 825 is received, the scheduler 811 may have data from messages 815, 820, and 825 queued for transmission. The scheduler 811 may then determine a wireless utilization based on these queued messages. A wireless utilization determined based on queued messages 815, 820, and 825 may be above a utilization threshold. As a result, FIG. 8 illustrates that the scheduler 811 initiates transmission on the network 715 after receiving data message 825.

In the illustrated embodiment, the scheduler 811 initiates transmission by transmitting a request-to-send message 830. A clear-to-send message 835 is then received from the network 715. After the clear-to-send message 835 is received, the scheduler 811 transmits data from messages 815, 820, and 825 over separate channels of the network 715. These separate channels may allow the data to be transmitted substantially simultaneously, therefore reducing the time required to send data1, data2, and data 3 when compared to sending data 1, data 2, and data 3 serially over a single channel. Because data message 840 may more fully utilize the capacity of the network 715, the overall utilization of the network 715 may be increased with implementations utilizing the scheduler 811 when compared to implementations utilizing the scheduler 710 illustrated in FIG. 7.

Figure 9:
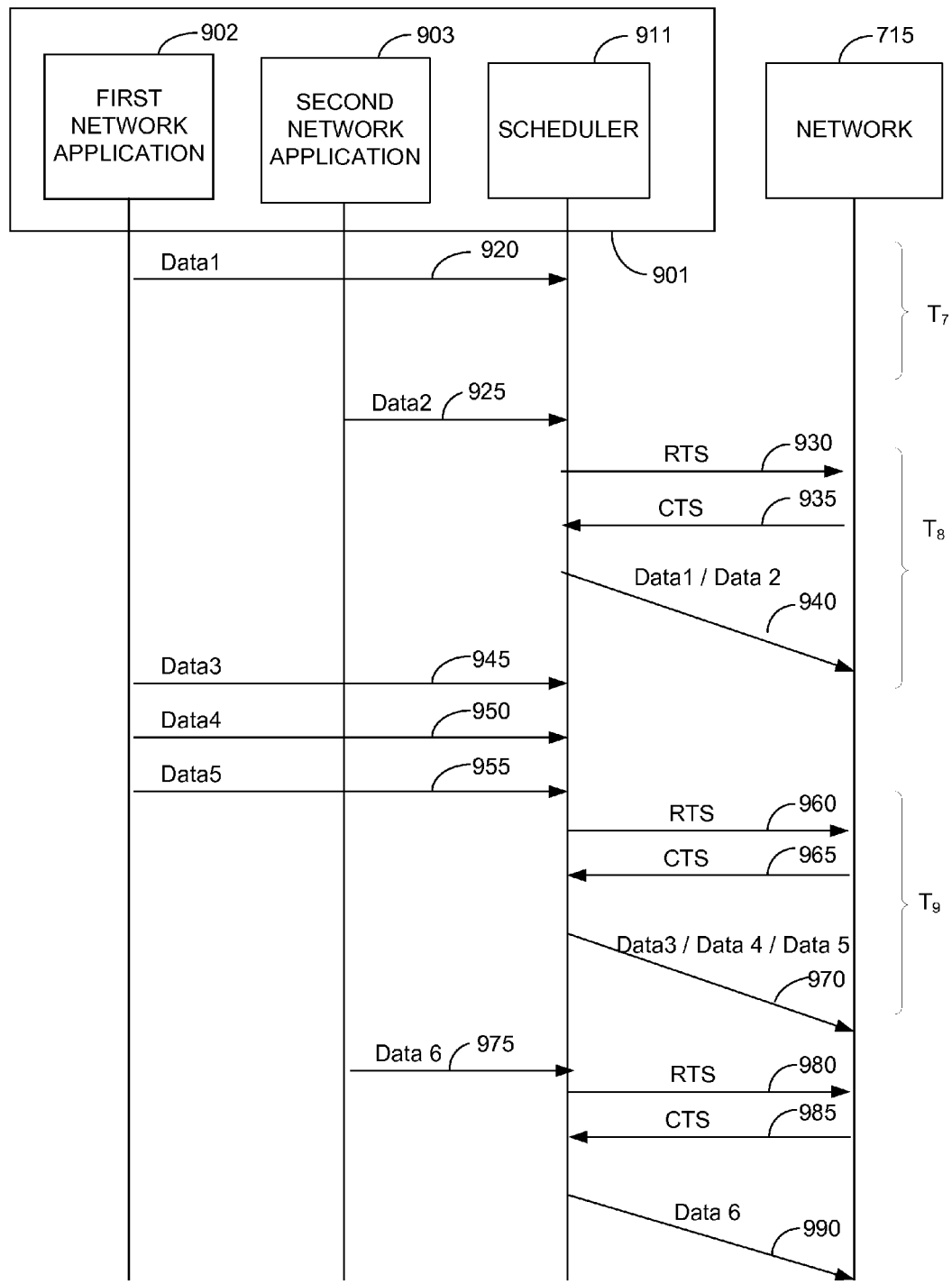
FIG. 9 is a timing diagram illustrating the operation of one implementation of a scheduler implementing one or more of the operative embodiments disclosed herein.

FIG. 9 is a timing diagram illustrating the operation of a scheduler implementing one or more of the operative embodiments disclosed herein. FIG. 9 shows a wireless device 901 and a wireless network 715. Wireless device 901 may be equivalent to wireless device 202 illustrated in FIG. 2. Within wireless device 901 are a first network application 902, a second network application 903, and a scheduler 911. The first network application 902, second network application 903, and scheduler 911 may be implemented as processor instructions stored in the memory component 206 of wireless device 202, illustrated in FIG. 2. These instructions may configure the processor 204 of wireless device 202 to perform one or more functions.

As in FIGS. 7 and 8, the network applications 902 and 903 may be any application that sends data on a wireless network. For example, each of network application 902 and 903 may be a web browsing application, instant messaging application, streaming application, or an email application. Similar to the schedulers of FIGS. 7 and 8, the scheduler 911 manages the transmission of messages on the network 715. The scheduler 911 may receive messages from both the first and second network applications 902 and 903. Those messages may be received directly from the network applications themselves, or indirectly from other intervening components of wireless device 202 (not shown).

In the illustrated embodiment, the first network application 902 may have one or more different characteristics than the second network application 903. For example, application 902 may be an interactive application, such as a web browser, or an instant messaging application, while network application 903 may be a streaming application, such as a media player. In some embodiments, the differing characteristics between the first network application 902 and the second network application 903 may result in different sensitivities to transmission delay between the first network application 902 and the second network application 903. The implementation of scheduler 911 may consider the delay sensitivities of the first network application 902 and the second network application 903. For example, in some embodiments, the scheduler 911 may delay transmission of data received from network applications 902 or 903 based at least in part on a delay sensitivity of the application.

In the illustrated embodiment of FIG. 9, the first network application 902 is less sensitive to transmission delay than the second network application 903. In an embodiment, the first network application may be a streaming application while the second network application may be an interactive application. FIG. 9 shows that a data message 920 is received by the scheduler from the first network application 902. In an embodiment, the scheduler 911 may insert data corresponding to message 920 into a transmission queue when message 920 is received. In response to receiving message 920, the scheduler 911 may also determine a network utilization based on messages in the transmission queue. In the illustrated embodiment, only one message is in the queue during time period $T_7$. The scheduler 911 may then determine whether to initiate transmission of data on network 715 based on the determined network utilization. The scheduler 911 may also determine whether to initiate transmission of data on network 715 based on a delay sensitivity of the first network application.

In the illustrated embodiment, because only one message is in the transmission queue, the determined network utilization may be below a predetermined utilization threshold. Furthermore, because the first network application is less sensitive to delay, its sensitivity may be below a predetermined delay sensitivity threshold. Therefore, scheduler 911 may determine that transmission should not be initiated on network 715 in response to receiving data message 920. Instead, transmission of data message 920 is delayed.

In an embodiment, transmission of data message 920 may be delayed until one or more conditions are met. For example, scheduler 911 may determine a maximum delay for messages sent by the first network application. When message 920 has been delayed by the maximum delay or longer, scheduler 911 may initiate transmission of data corresponding to message 920 on the network 715, regardless of the network utilization that may result from the transmission.

Alternatively, transmission of data message 920 may be delayed until additional data is queued for transmission by the scheduler 911. The additional queued data may increase a determined network utilization such that the determined utilization is above a predetermined utilization threshold. The scheduler 911 may then initiate transmission of data corresponding to data message 920 based on the increased utilization.

Transmission of data message 920 may also occur opportunistically based on the scheduler 911 receiving data from a second network application. If the second network application is more sensitive to transmission delay, the scheduler 911 may initiate transmission on the wireless network to avoid introducing delay to the transmission of messages from the second network application. When transmission is initiated, messages from the first network application may also be transmitted by the scheduler 911. This scenario is illustrated next in FIG. 9.

The scheduler 911 receives a data message 925 from the second network application 903. In an embodiment, the scheduler 911 may add an indicator of data message 925 to a transmission queue when it is received. As discussed above, the second network application may be an interactive application, such as an instant messaging program or web browser. Because the second network application is sensitive to delay, the scheduler 911 may initiate transmission of data on network 715 in response to receiving message 925 from the second network application. Transmission may be initiated even if the scheduler 911 determines that a network utilization based on queued messages 920 and 925 is less than a predetermined utilization threshold.

As illustrated, when data message 925 is received by the scheduler 911, the scheduler 911 initiates transmission on network 715. To initiate transmission in the illustrated embodiment, scheduler 911 transmits a request-to-send message 930. A clear-to-send message 935 is then received from the network 715. In response, scheduler 911 transmits data message 940 on network 715. Data message 940 may include data corresponding to messages 920 and 925, received from first and second network applications 902 and 903. In some embodiments supporting the concurrent transmission of data over multiple channels, data corresponding to message 920 may be transmitted over a first channel while data corresponding to data message 925 may be transmitted over a second channel. In embodiments that support the simultaneous transmission of data over more than two channels, a wireless medium may not be fully utilized during time period $T_8$ when data message 940 is transmitted on network 715.

FIG. 9 then illustrates that three messages are received from the first network application 902 by the scheduler 911. Because the first network application 902 is less sensitive to delay, the scheduler 911 may not initiate transmission on network 715 in response to receiving messages 945 or 950. For example, a determined wireless network utilization based on a queue including message 945, or a queue including message 945 and message 950, may be below a predetermined network utilization threshold. When message 955 is received by the scheduler 911, scheduler 911 may determine a network utilization based on a transmission queue that includes at least data corresponding to messages 945, 950, and 955. In the illustrated embodiment, the determined network utilization may be over a predetermined network utilization threshold. For example, if network 715 supports the transmission of data over a maximum of three channels simultaneously, a transmission queue including data corresponding to messages 945, 950, and 955 may enable utilization of the medium at a level above the predetermined network utilization threshold. As a result, scheduler 911 initiates transmission by transmitting request-to-send message 960. A clear-to-send message 970 is then received from the network 715. In response, the scheduler 911 transmits data message 970. Data message 970 may send data corresponding to data 3, data 4, and data 5 over three separate channels of wireless network 715. For example, in an embodiment, network 715 may support MIMO.

FIG. 9 next illustrates that a data message 975 from the second network application 903 is received by the scheduler 911. If scheduler 911 determines a network utilization based on the transmission queue, the network utilization may be below the predetermined utilization threshold when the transmission queue only includes data corresponding to message 975. Because the second network application 903 is sensitive to delay however, the scheduler may initiate transmission on network 715 in response to receiving data message 975, as shown by messages 980, 985, and 990. If the network 715 supports the concurrent transmission of data on multiple channels, the transmission of data message 990 may result in lower network utilization than, for example, the transmission of network message 970.

Figure 10:
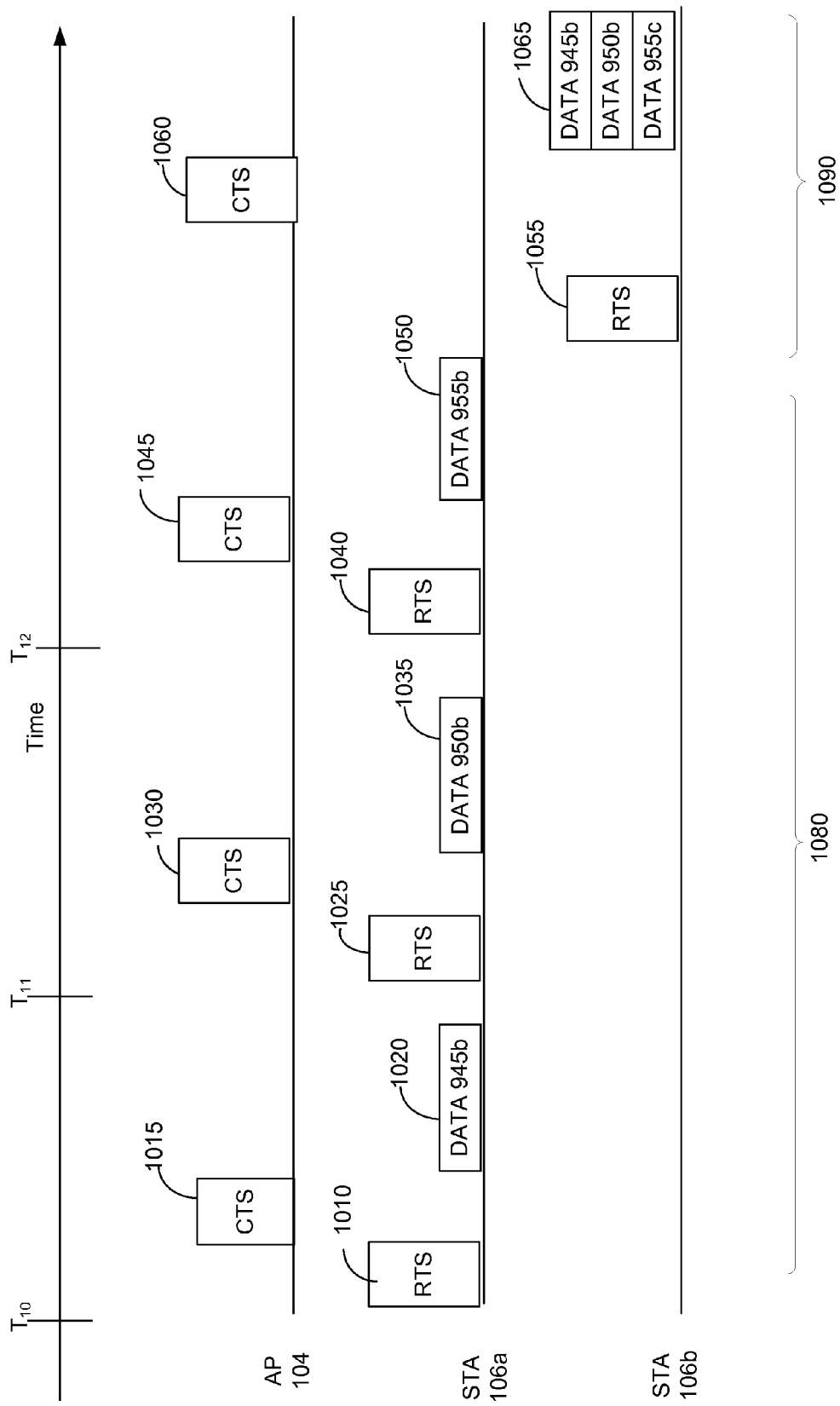
FIG. 10 illustrates the transmission of identical data by a station using the scheduler of FIG. 7 and a station using the scheduler of FIG. 8.

FIG. 10 illustrates the transmission of identical data by a station using a scheduler 710 and a station using a scheduler 811 implementing at least one of the disclosed embodiments. A network application (not shown) running on both of stations 106a and 106b generates three identical data messages 945a, 950a, and 955a (not shown) and sends them to a scheduler implemented within STA 106a and STA 106b. The scheduler implemented by STA 106a is scheduler 710 illustrated in FIG. 7. The scheduler implemented by STA 106b is scheduler 811 of FIG. 8 or 911 of FIG. 9. The identical data messages are generated and send to the schedulers at times $T_{10}$, $T_{11}$, and $T_{12}$.

The duration of time between times $T_{10}$ and $T_{11}$, and may be greater than the time required for the schedulers of STA 106a-b to obtain a transmission opportunity in response to receiving any one of the messages. As shown, because STA 106a utilizes a scheduler 710, STA 106a transmits data on the network 715 corresponding to the messages 945a, 950a, and 955a (not shown) as its scheduler receives the messages from a network application (not shown) at times $T_{10}$, $T_{11}$, and $T_{12}$. STA 106a transmits data by first transmitting request-to-send messages 1010, 1025, and 1040. Clear-to-send messages 1015, 1030, and 1045 are then received in response. In an embodiment, clear-to-send messages 1015, 1030, and 1045 are sent by an access point. After receiving clear-to-send messages 1015, 1030, and 1045, STA 106a transmits data messages 1020, 1035, and 1050, containing data 945b, 950b, and 955b corresponding to internal messages 945a, 950a, and 955a respectively.

Because STA 106b is implemented utilizing scheduler 811 or 911, STA 106b does not initiate transmission at times $T_{10}$ and $T_{11}$ when its scheduler receives data from the network application. Instead, in the illustrated embodiment, the scheduler of STA 106b determines that a network utilization for transmitting the received messages 945 and 950 is less than a predetermined utilization threshold. Therefore, transmission is not initiated when messages are received at times $T_{10}$ and $T_{11}$. When the message 955 is received at time $T_{12}$, the scheduler of STA 106b determines a network utilization for the message that is above the predetermined utilization threshold. However, in the illustrated scenario of FIG. 10, STA 106a obtains a transmission opportunity before STA 106b. This may inhibit STA 106b from transmitting until after STA 106a has utilized its transmission opportunity to transmit data 1050. STA 106b then obtains a transmission opportunity by transmitting a request-to-send message 1055 and receives a clear-to-send message 1060, for example, from an access point. STA 106b is then able to transmit data corresponding to the data messages received at times $T_{10}$, $T_{11}$, and $T_{12}$ concurrently on multiple separate channels of the wireless medium. This is shown by message 1065.

STA 106b provides for higher wireless utilization and more efficient transmission of data than STA 106a. For example, while STA 106a utilized time 1080 to complete transmission of the data messages generated at times $T_{10}$, $T_{11}$, and $T_{12}$, STA 106b utilized substantially less time 1090 to transmit the same messages.

Figure 11:
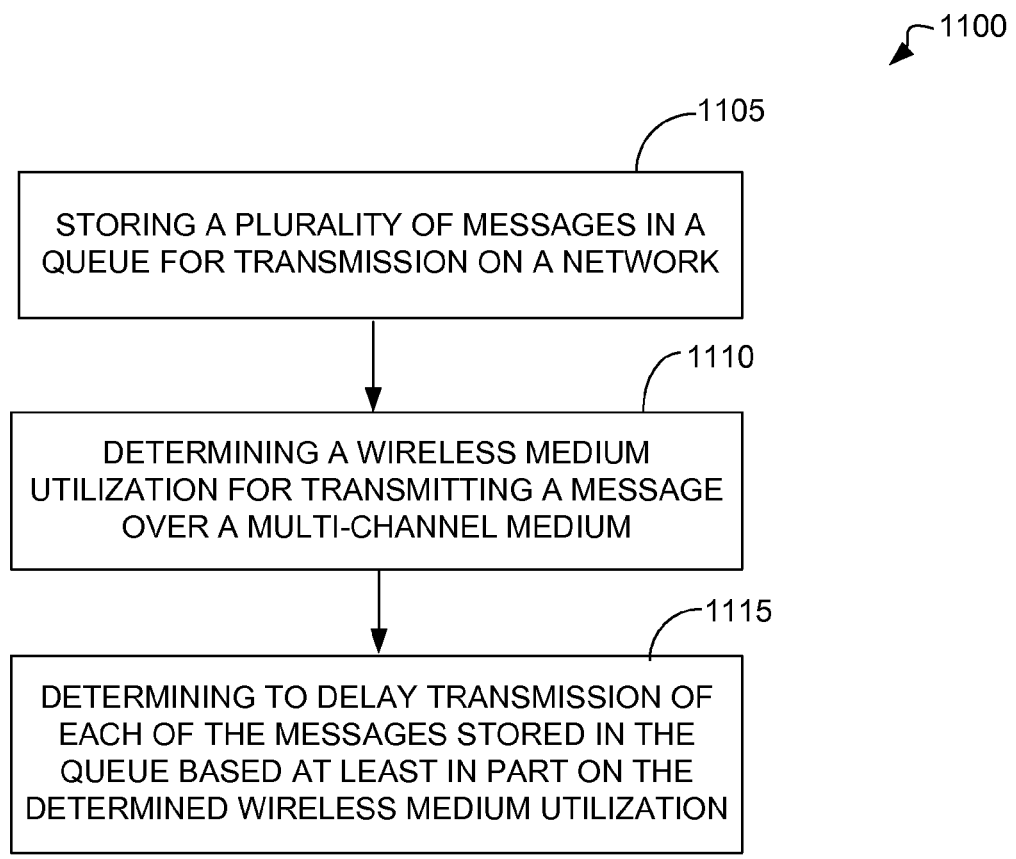
FIG. 11 is a flowchart of one embodiment of a process for transmitting data on a wireless network.

FIG. 11 is a flowchart of one embodiment of a process for transmitting data on a wireless network. In an embodiment, process 1100 may be implemented by wireless device 202, illustrated in FIG. 2. In block 1105, a plurality of messages are stored in a queue for transmission on a network connection. In an embodiment, the plurality of messages may be for one network conversation or communication flow between a source and destination. A network conversation may correlate an exchange of network messages between two entities. For example, the plurality of messages may be queued for transmission over the same TCP connection, with the TCP connection identifying the communication flow or network conversation. In another example, the plurality of messages may share the same destination and source service access point (SAP). In this example, the plurality of messages may be queued for transmission using the UDP protocol, with the source SAP and destination SAP, along with the UDP protocol identifier identifying the communication flow between the source and destination SAP or "conversation.".

In other embodiments, the plurality of messages queued for transmission may be for different network communication flows between a source and destination or different network conversations. For example, a first portion of the plurality of messages may be for transmission over a first network communication flow or conversation, and a second portion of the plurality of messages may be for transmission on a second network communication flow or conversation. In an embodiment, the first and second network communication flows may correspond to a first and second TCP connection, or a first and second combination of source and destination addresses and service access points (for example, when using the UDP protocol).

In block 1110, a wireless medium utilization for transmitting a message over a multi-channel medium is determined. In an embodiment, the multi-channel medium may support the transmission of data over n channels in parallel, or substantially simultaneously. In an embodiment, block 1110 may compare the number of channels n to the number of messages m stored in the queue for transmission. In an embodiment, block 1110 may compare the number of channels n to a number of communication flows or conversations c corresponding to the number of messages stored in the queue. In an embodiment, a communication flow may correspond to an individual TCP connection, identified by a source and destination IP address and a source and destination service access point (SAP). In an embodiment, a single communication flow or conversation may correspond to a protocol identifier and a source and destination SAP.

In an embodiment, determining a wireless utilization may comprise comparing m or c to a predetermined threshold. For example, in an embodiment, the predetermined threshold may be based on a number of simultaneous transmission channels supported by the wireless medium n. In some implementations, the predetermined threshold may be equal to the maximum number of simultaneous transmission channels n. In an embodiment, the predetermined threshold may be less than n. For example, if n=3, the predetermined threshold may be three (3), or two (2).

Block 1115 determines whether to delay transmission of each of the messages stored in the queue based at least in part on the determined wireless medium utilization. In an embodiment, if a number of messages in the queue or a number of communication flows or conversations corresponding to messages in the queue is above a predetermined threshold, transmission on the wireless medium may be initiated. If the number of messages or the number of communication flows or conversations is below the predetermined threshold, transmission of each of the messages stored in the queue may be delayed.

In an embodiment, the predetermined threshold may be based on a maximum number of data channels supported by the wireless medium. For example, in an embodiment, the threshold may be one hundred (100) percent of the number of data channels supported by the multi-channel medium. For example, in an embodiment that supports three transmission channels, at least three messages or three messages corresponding to three different network communication flows between a source and destination or conversations may be queued before transmission is initiated. In another embodiment, the threshold may be less than 100% of the number of channels. For example, it may correspond to at least fifty percent of the channels.

Figure 12A:
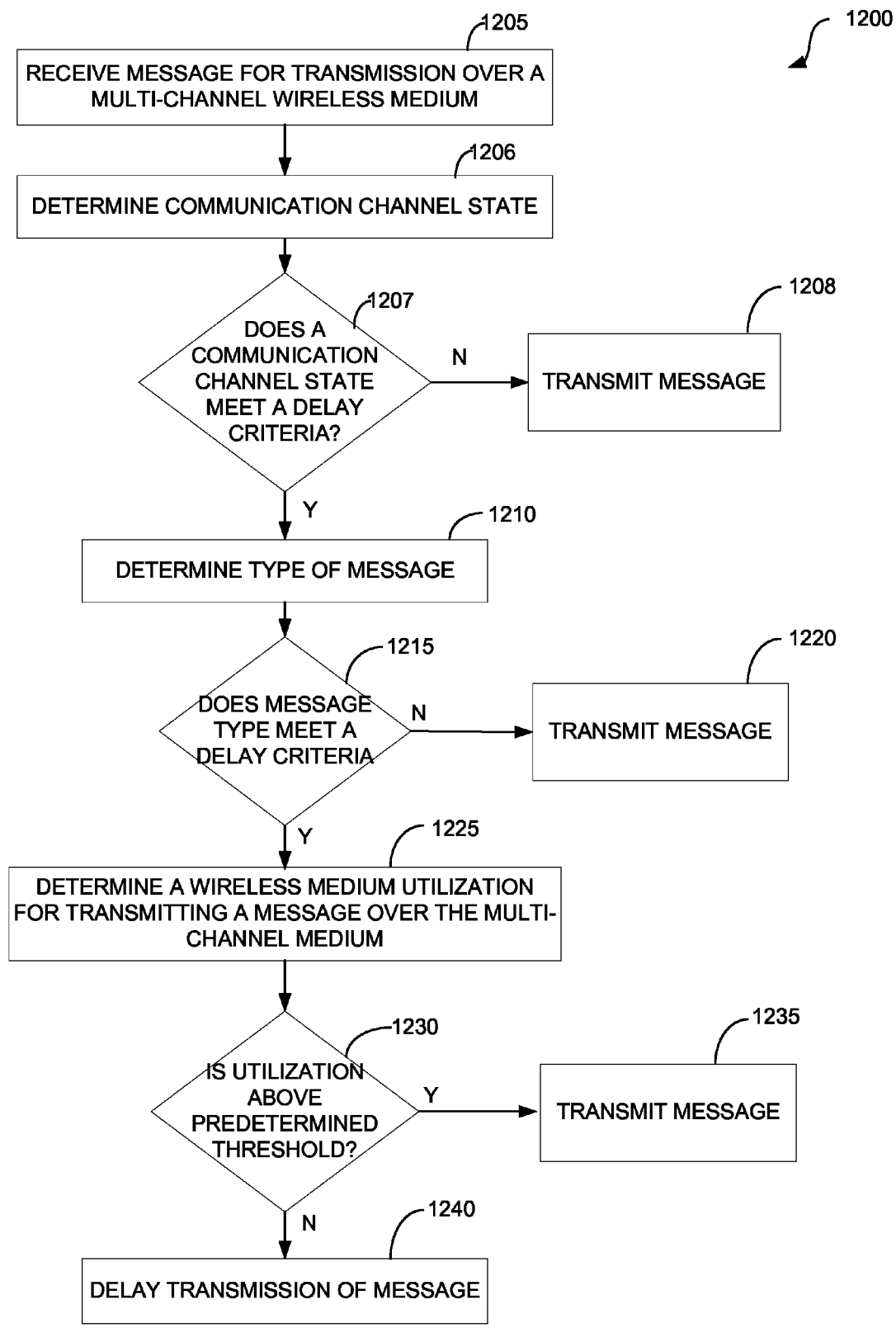
FIG. 12A is a flowchart of one embodiment of a process for transmitting data on a wireless network.

FIG. 12A is a flowchart of one embodiment of a process for transmitting data on a wireless network. In an embodiment, process 1200 may be implemented by wireless device 202, illustrated in FIG. 2. In block 1205, a message is received for transmission over a multi-channel wireless medium. In an embodiment, block 1205 may include inserting the message onto a queue of messages waiting for transmission. In block 1206, a communication channel state is determined. In an embodiment, a communication channel state may indicate the lifecycle state of the communication channel. For example, the communication channel state may indicate if the connection is connecting, established, or disconnecting. In another embodiment, the communication channel state may indicate the size of a TCP congestion window. For example, the communication channel state may indicate whether a TCP connection is in a slow start state, where the congestion window is below or equal to a slow start threshold, or if the TCP connection is in a full throughput mode, where the congestion window may be above a slow start threshold.

In an embodiment, the communication channel state may be inferred based on a transmission or reception rate over the communication channel during a time period. If the transmission or reception rate over the communication channel is above a predetermined threshold, then it may be inferred that the communication channel is not in a slow-start or ramp up mode. In an embodiment, if the transmission or reception rate over the communication channel is below a predetermined threshold, then it may be inferred that the communication channel is in a slow-start or ramp-up mode.

In an embodiment, the communication channel state may indicate a number of messages queued for transmission on the communication channel. For example, the maximum number of messages queued for transmission to a particular node or STA may be included in the communication channel state.

If the communication state does not meet a delay criteria in decision block 1207, the message is transmitted in block 1208. In an embodiment, the delay criteria may include whether a TCP connection is in a slow state or ramp-up phase. If the connection is in a ramp-up phase, it may not be desirable to delay transmission of messages on the connection. Delaying messages during the ramp-up or slow start phase of the TCP connection may cause TCP to make incorrect determinations as to the nature of the connection, reducing throughput and performance. In an embodiment, the delay criteria may include whether the number of messages queued for transmission on the communication channel or to a particular STA or node exceeds a maximum number of messages that may be delayed. In an embodiment, if the number of messages queued is above a maximum, the communication channel state may not meet a delay criteria, and the messages queued for transmission may be transmitted in block 1208.

If the communication state does meet the delay criteria, the type of message is determined in block 1210. In an embodiment, the type of message may indicate one or more characteristics of the message. For example, the type of message may indicate the type of network application sending the message. The type of network application may indicate a sensitivity to delay of transmission of the message. For example, if the message is sent by an interactive network application, the type of message may indicate that the message is sensitive to delay. If the message is sent by a streaming application, the type of message may indicate the message is less sensitive to delay than a message sent by an interactive application. In an embodiment, the type of message may indicate a sensitivity to delay directly, and not necessarily identify a network application. In an embodiment, the type of message may indicate a maximum delay tolerated by the network application sending the message. In this embodiment, if an interactive network application cannot tolerate intentionally introduced delays to improve wireless medium utilization, it may indicate a maximum delay of zero (0). In an embodiment, the message type may indicate a length of the message.

Note that in some embodiments, the message type may indicate one, some or all of the information described above. For example, in one embodiment, the message type may indicate a length of the message, a sensitivity to delay of the message, a maximum wait time of the message, and a network application generating the message.

How the type of message is determined may vary by embodiment. For example, in some embodiments, the type of message may be indicated when a network application sends a message to a message scheduler, such as scheduler 811 or 911 illustrated in FIGS. 8 and 9. In an embodiment, the network application may explicitly specify the type of message when sending the message to the scheduler. In an embodiment, the type of message may indicate a maximum delay duration of the message.

Alternatively, the message type may be determined based on the message. For example, the message contents may be examined to determine the type of message. In an embodiment, deep packet inspection may be used to look beyond the data portion of a message and to analyze one or more protocol headers of the message. In an embodiment, the type of message may be based on the protocol headers.

In an embodiment, the message of block 1210 is sent by a network application. In an embodiment, the message type may be based on a pattern of messages received from the network application that sent the message. For example, characteristics of one or more messages generated by the network application such as a median or average or maximum message length, elapsed time between messages, the number of messages sent within a time period, protocol headers sent with the messages, and the like may be used to determine the type of the message sent.

In one embodiment, if a measurement of message length from a series of messages sent by the network application is below a threshold, the message may be determined to be a first type of message. If the measurement of the message length is above a predetermined threshold, the message may be determined to be a second type of message. In an embodiment, the first type of message may be an interactive message, while the second type of message may be a streaming message. In an embodiment, interactive messages may be determined to be more sensitive to delay than streaming messages.

Block 1215 determines whether the message type meets a delay criteria. For example, in an embodiment, a message type indicating that an interactive application generated the message may not meet the delay criteria. In an embodiment, a message type indicating that a streaming application generated the message may meet the delay criteria. In an embodiment, the delay criteria may provide that only messages with a length less than a predetermined maximum may be delayed. Therefore, messages exceeding the maximum length may have a message type that does not meet the delay criteria. In an embodiment, the delay criteria may include consideration of one or more indications provided by the message type described above. For example, a delay criteria may include messages below a maximum message size that are also generated by a streaming application. If the message type does not meet the delay criteria in decision block 1215, then the message is transmitted in block 1220.

Transmitting a message may include inserting data indicating the message onto a queue of messages that may be transmitted as soon as possible, or at the first transmission opportunity on the wireless medium. In an embodiment, transmitting the message may also include removing the message from a queue of messages delayed or otherwise waiting for transmission.

If the message type does allow for delay, then a wireless medium utilization for transmitting the message over the multi-channel medium is determined in block 1225. If the determined utilization is above a threshold in block 1230, the message is transmitted in block 1235. Otherwise, transmission of the message is delayed in block 1240. In an embodiment, delaying transmission of the message may include placing the message on a message queue.

Transmitting the message in block 1235 may also include transmitting other messages. For example, a first message may be processed by process 1200 and delayed by block 1240. Later, a second message may be processed by process 1200. When a wireless medium utilization is determined in block 1225, it may be based on the second message. The utilization determined by block 1225 may also be based on the delayed first message. If the utilization is above a utilization threshold, the first message may be transmitted in block 1235 and then the second message may be transmitted in block 1235. In an embodiment, the first and second messages may be transmitted on two data channels of a wireless medium substantially simultaneously.

Figure 12B:
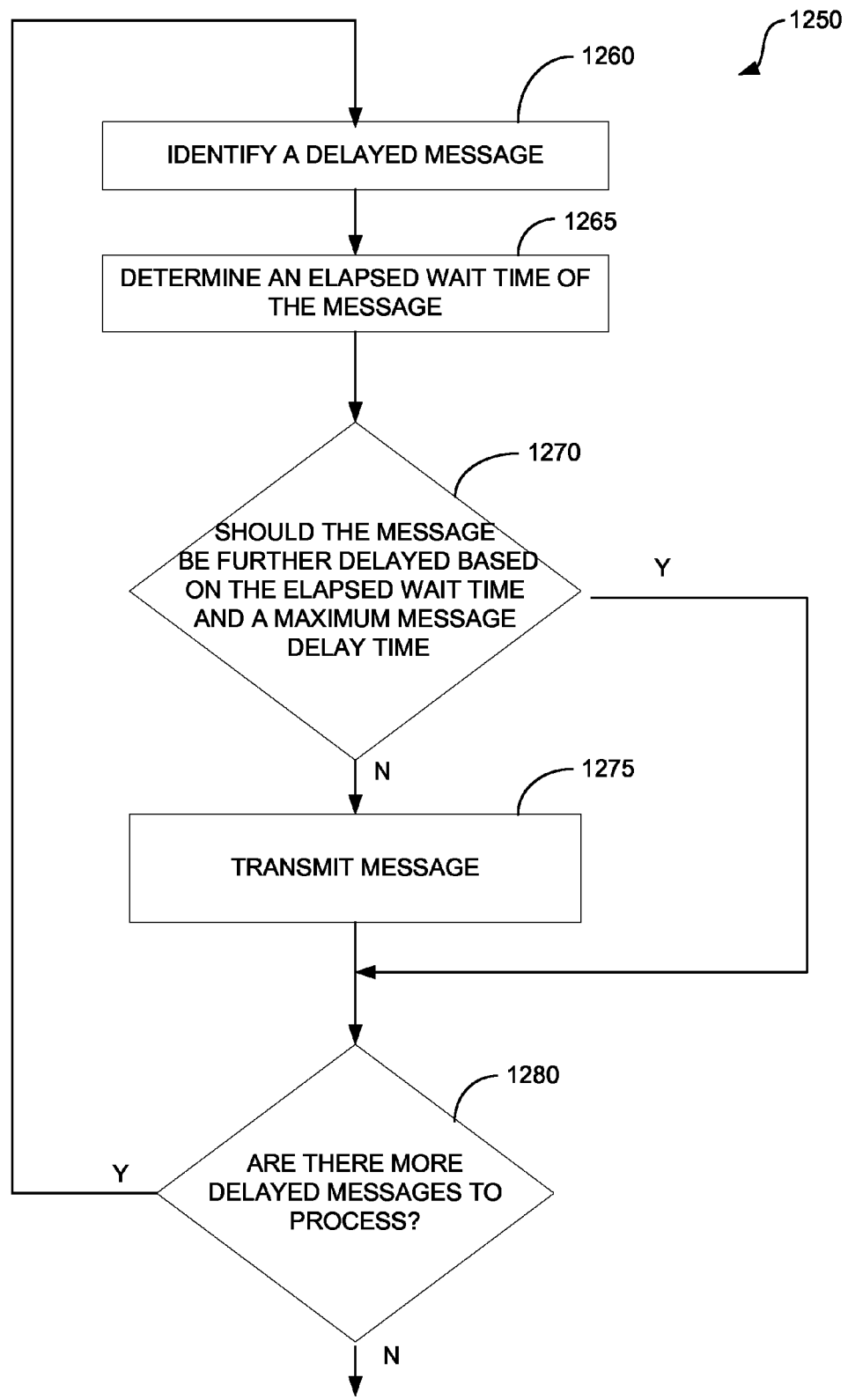
FIG. 12B is a flowchart of one embodiment of a process for transmitting data on a wireless network.

FIG. 12B is a flowchart of one embodiment of a process for transmitting data on a wireless network. In an embodiment, process 1250 may be implemented by wireless device 202, illustrated in FIG. 2. In an embodiment, process 1250 may process messages delayed in block 1240 of process 1200. In block 1260, a delayed message is identified. In an embodiment, the delayed message may be identified by examining a queue of delayed messages. In block 1265, an elapsed wait time of the message is determined. In an embodiment, the elapsed wait time may be a duration of time measured from when the delayed message was initially delayed by block 1240 of process 1200, until a time block 1265 is performed. Decision block 1270 determines whether the message should be further delayed based on the elapsed wait time of the message and a maximum message delay time. In an embodiment, if the elapsed wait time of the message is above a maximum delay time in block 1270, then the message is transmitted in block 1275. In an embodiment, if the elapsed wait time of the message is within a predetermined threshold distance of the maximum wait time, the message is transmitted in block 1275. The maximum message delay time may be specific to each message, the network application sending the message received in block 1205, or the type of message determined in block 1210. For example, interactive type applications may have a shorter maximum delay time than streaming applications. Alternatively, the type of message may indicate the maximum delay time directly. Some embodiments may also include a "global" maximum delay time that is applied to all messages or packets. In these embodiments, a message with an elapsed wait time greater than the "global" maximum delay time may be transmitted in block 1275, even if the message's elapsed wait time is lower than a maximum wait time specified by a network application generating the message. The global maximum delay time may be dynamically updated based on conditions of the wireless medium. In some embodiments, the global maximum delay time may be received from an access point, or from another node on the wireless network.

In an embodiment, the maximum delay time may be received from an access point. The access point may receive the maximum delay time information from an application server transmitting the messages. For example, an application server may transmit a message in a message header that can be decoded by an access point. The message may indicate how much delay is tolerable for the packets transmitted by the server.

In an embodiment, the maximum delay time may be based on a network application that generated the message. For example, the maximum delay time may be indicated by the network application. Alternatively, the maximum delay time may be indicated based on the type of the message. When the message is delayed in block 1240 of process 1200, an indication of a maximum delay time may be recorded in a queue along with data indicating the message. Process 1250 may determine the maximum delay time based on the queue.

In an embodiment, transmitting the message in block 1275 may include adding the message to a queue of messages that should be transmitted as soon as possible. Transmitting the message in block 1275 may also include removing the message from a queue storing delayed messages.

Block 1280 determines if there are more delayed messages to be processed. In an embodiment, block 1280 may be performed by iterating through a queue of delayed messages. If all the messages in the queue have been processed during a current invocation of process 1250, then block 1280 may determine there are no more messages to process. In an embodiment, if the queue includes messages that have not been processed during a current invocation of process 1250, process 1250 returns to block 1260 where a next delayed message is identified.

Figure 13:
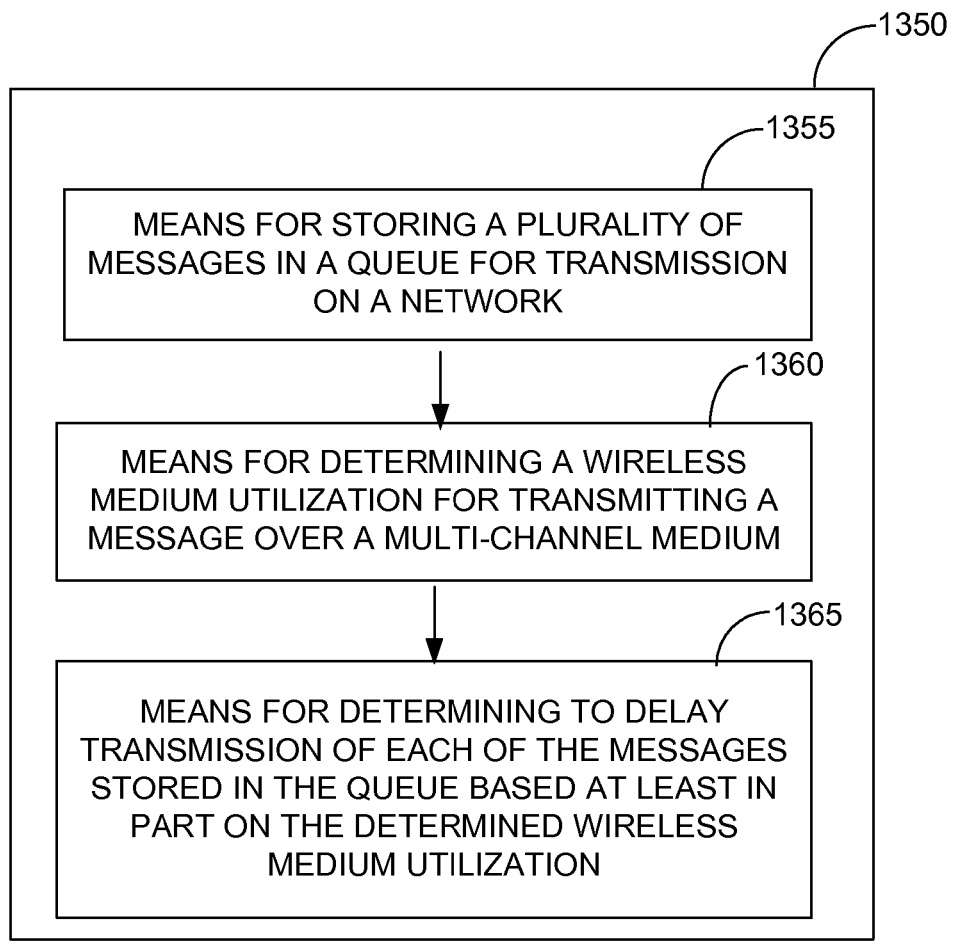
FIG. 13 is a functional block diagram of an exemplary device 1350 that may be employed within the wireless communication system 100.

FIG. 13 is a functional block diagram of an exemplary device 1350 that may be employed within the wireless communication system 100. The device 1350 includes means 1355 for storing a plurality of messages in a queue for transmission on a network. In an embodiment, means 1355 may be configured to perform one or more of the functions discussed above with respect to block 1105 or 1205. In an embodiment, the means for storing a plurality of messages in a queue for transmission on a network may include a processor, such as processor 204 of FIG. 2. Means 1355 may also include one or more of a signal generator, transceiver, decoder, or a combination of hardware and/or software component(s), circuits, and/or module(s).

The device 1350 further includes means 1360 for determining a wireless medium utilization for transmitting a message over a multi-channel medium. In an embodiment, means 1360 may be configured to perform one or more of the functions discussed above with respect to block 1110 or 1225. The means 1360 for determining a wireless medium utilization for transmitting a message over a multi-channel medium may include a processor, such as processor 204 of FIG. 2. Means 1360 may also include one or more of a signal generator, transceiver, decoder, or a combination of hardware and/or software component(s), circuits, and/or module(s).

The device 1350 further includes means 1365 for determining to delay transmission of each of the messages stored in the queue based at least in part on the determined wireless medium utilization. In an embodiment, means 1365 may be configured to perform one or more of the functions discussed above with respect to block 1115 or 1230 and 1240. In an embodiment, the means for determining to delay transmission of each of the messages stored in the queue based at least in part on the determined wireless medium utilization may be a processor, such as processor 204 of FIG. 2. Means 1365 may also include one or more of a signal generator, transceiver, decoder, or a combination of hardware and/or software component(s), circuits, and/or module(s).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of managing the utilization of a wireless medium capable of transmitting multiple channels simultaneously, comprising:
   storing, via the first wireless device, a plurality of messages in a queue for transmission on the wireless medium;
   determining, via the first wireless device, a utilization of the multiple channels by the first wireless device for transmission of at least a first queued message;
   determining, via the first wireless device, to delay transmission of each of the messages if the determined utilization of the multiple channels is below a threshold; and
   transmitting, via the first wireless device, each of the messages if the determined utilization of the multiple channels is above the threshold.

2. The method of claim 1, further comprising:
   determining a type of the first message; and
   determining whether to delay the transmission of the first message based at least in part on the type.

3. The method of claim 1, further comprising:
   determining a connection state for a network connection; and
   determining whether to delay transmission of the first message based at least in part on the connection state.

4. The method of claim 3, wherein the connection state indicates whether the network connection is in a ramp-up mode.

5. The method of claim 1, wherein the first message is transmitted if the number of messages waiting for transmission is above a predetermined threshold.

6. The method of claim 1, wherein the wireless channels are spatial channels.

7. The method of claim 2, wherein the type of the first message indicates a type of network application transmitting the first message.

8. The method of claim 2, wherein the type of the first message is determined by data in the first message.

9. The method of claim 2, wherein the type of the first message is determined based on a pattern of arrival of a plurality of messages on a network connection.

10. The method of claim 2, wherein the type of the first message is determined by a service access point of the first message.

11. The method of claim 2, wherein the type of the first message indicates a maximum time transmission of the first message may be delayed.

12. The method of claim 1, wherein transmission of the first message is delayed by at most a maximum time period.

13. An apparatus for increasing the utilization of a wireless medium capable of transmitting multiple channels simultaneously, comprising:
    a processor configured to:
       store a plurality of messages in a queue for transmission on the wireless medium;
       determine a utilization of the multiple channels by the apparatus for transmission of at least a first message;
       determine to delay transmission of each of the messages if the determined utilization of the multiple channels is below a threshold; and
       transmitting each of the messages if the determined utilization is above the threshold.

14. The apparatus of claim 13, wherein the processor is further configured to:
    determine the type of the first message and determine whether to delay transmission of the first message based on the type.

15. The apparatus of claim 13, wherein the processor is further configured to determine a connection state for the network connection, and determine whether to delay transmission of the first message based at least in part on the connection state.

16. The apparatus of claim 15, wherein the connection state indicates whether the network connection is in a ramp-up mode.

17. The apparatus of claim 13, further comprising a transmitter configured to transmit the first message if the number of messages waiting for transmission is above a predetermined threshold.

18. The apparatus of claim 13, wherein the wireless channels are spatial channels.

19. The apparatus of claim 14, wherein the type of the first message indicates a type of network application transmitting the first message.

20. The apparatus of claim 14, wherein the type of the first message indicates a type of network application transmitting the first message.

21. The apparatus of claim 14, wherein the type of the first message indicates a maximum time transmission of the first message may be delayed.

22. The apparatus of claim14 wherein the type of the first message is determined by data in the first message.

23. The apparatus of claim 14, wherein the processor is further configured to determine the type of the first message based on a pattern of arrival of a plurality of messages on a network connection.

24. The apparatus of claim 14, wherein the processor is further configured to delay transmission of the first message by at most a maximum time period.

25. An apparatus for increasing the utilization of a wireless medium capable of transmitting multiple channels simultaneously, comprising:
    means for storing a plurality of messages in a queue for transmission on the wireless medium;
    means for determining a wireless medium utilization for transmitting a message over the multi-channel medium, wherein the means for determining is configured to determine a utilization of the multiple channels by the apparatus for transmission of at least a first message;
    means for determining to delay transmission of each of the messages if the determined utilization of the multiple channels is below a threshold
    means for transmitting each of the messages if the determined utilization of the multiple channels is above the threshold.

26. The apparatus of claim 25, further comprising:
    means for determining a type of the first message; and
    means for determining whether to delay transmission of the first message based on the type.

27. The apparatus of claim 25, further comprising:
    means for determining a connection state for the network connection; and
    means for determining whether to delay transmission of the first message based at least in part on the connection state.

28. The apparatus of claim 27, wherein the connection state indicates whether the network connection is in a ramp-up mode.

29. The apparatus of claim 25, further comprising means for transmitting the first message if the number of messages waiting for transmission is above a predetermined threshold.

30. The apparatus of claim 25, wherein the wireless channels are spatial channels.

31. The apparatus of claim 26, wherein the type of the first message indicates a type of network application transmitting the first message.

32. The apparatus of claim 26, further comprising means for determining the type of the first message by data in the first message.

33. The apparatus of claim 26, wherein the type of the first message indicates a maximum time transmission of the first message may be delayed.

34. The apparatus of claim 26, further comprising means for determining the type of the first message based on a pattern of arrival of a plurality of messages on a network connection.

35. The apparatus of claim 25, wherein the means for delaying transmission of the first message delays transmission for at most a maximum time period.

36. A non-transitory, computer readable medium comprising instructions that when executed cause a processor to perform a method of managing the utilization of a wireless medium capable of transmitting multiple channels simultaneously, the method comprising:
   storing a plurality of messages in a queue for transmission on the wireless medium;
   determining a utilization of the multiple channels by the apparatus for transmission of at least a first message; and
   determining to delay transmission of each of the messages if the determined utilization of the multiple channels is less than a threshold
   transmitting each of the messages if the determined utilization of the multiple wireless channels is greater than the threshold.

37. The non-transitory computer readable medium of claim 36, wherein the method performed by the processor further comprises:
   determining a type of the first message; and
   determining whether to delay the transmission of the first message based at least in part on the type.

38. The non-transitory computer readable medium of claim 36, wherein the method performed by the processor further comprises:
   determining a connection state for a network connection; and
   determining whether to delay transmission of the first message based at least in part on the connection state.

39. The non-transitory computer readable medium of claim 36, wherein the connection state indicates whether the network connection is in a ramp-up mode.

40. The non-transitory computer readable medium of claim 36, wherein the first message is transmitted if the number of messages waiting for transmission is above a predetermined threshold.

41. The non-transitory computer readable medium of claim 36, wherein the wireless channels are spatial channels.

42. The non-transitory computer readable medium of claim 37, wherein the type of the first message indicates a type of network application transmitting the first message.

43. The non-transitory computer readable medium of claim 37, wherein the type of the first message is determined by data in the first message.

44. The non-transitory computer readable medium of claim 37, wherein the type of the first message is determined based on a pattern of arrival of a plurality of messages on a network connection.

45. The non-transitory computer readable medium of claim 37, wherein the type of the first message is determined by a service access point of the first message.

46. The non-transitory computer readable medium of claim 36, wherein transmission of the first message is delayed by at most a maximum time period.

47. The non-transitory computer readable medium of claim 37, wherein the type of the first message indicates a maximum time transmission of the first message may be delayed.

* * * * *